United States Patent [19]

Hirasawa et al.

[11] Patent Number: 5,054,814
[45] Date of Patent: Oct. 8, 1991

[54] PASSIVE TYPE SEAT BELT MOUNTING STRUCTURE

[75] Inventors: Kiyoshi Hirasawa; Nobunari Yamamoto, both of Shizuoka, Japan

[73] Assignee: Suzuki Motor Company Limited, Shizuoka, Japan

[21] Appl. No.: 542,174

[22] Filed: Jun. 22, 1990

[30] Foreign Application Priority Data

Jun. 23, 1989 [JP] Japan ............................. 1-74162[U]
Jun. 23, 1989 [JP] Japan ............................. 1-161030

[51] Int. Cl.$^5$ ............................................. B60R 22/08
[52] U.S. Cl. ................................. 280/803; 280/807
[58] Field of Search .............. 280/803, 802, 801, 808, 280/807

[56] References Cited

U.S. PATENT DOCUMENTS

| 4,149,737 | 4/1979 | Magyar | 280/807 |
| 4,315,639 | 2/1982 | Booth et al. | 280/803 |
| 4,394,034 | 7/1983 | Murphy | 280/801 |
| 4,621,835 | 11/1986 | Edwards | 280/803 |
| 4,787,651 | 11/1988 | Shinozaki | 280/803 |

FOREIGN PATENT DOCUMENTS

| 59-14546 | 1/1984 | Japan | 280/807 |
| 62-160918 | 7/1987 | Japan | 280/803 |
| 63-222958 | 9/1988 | Japan | 280/807 |
| 779114 | 11/1980 | U.S.S.R. | 280/807 |

Primary Examiner—Charles A. Marmor
Assistant Examiner—Karin Tyson
Attorney, Agent, or Firm—McGlew & Tuttle

[57] ABSTRACT

The present invention relates to a passive type seat belt mounting structure wherein the seat belt is forcibly loaded around the body of the occupant upon he/she sitting down in a vehicle seat and closing a door, wherein a shoulder retractor and a lap retractor around which a seat belt is wound is attached to a common bracket which is in turn attached to the interior of the door panel.

4 Claims, 7 Drawing Sheets

PASSIVE TYPE SEAT BELT MOUNTING STRUCTURE

FIELD OF THE INVENTION AND RELATED ART STATEMENT

The present invention relates to a passive type seat belt mounting structure.

Various types of seat belt arrangements are used today in motor vehicles as the use of such seat belt arrangements has been made mandatory for occupants to ensure safety against accidents during driving. However, many drivers do not wear such seat belts merely for the reason of accompanied inconvenience. Thus, a so-called passive type seat belt is effectively preferred, wherein the belt is forcibly loaded in place around the body of the occupant upon the occupant sitting down in the seat and closing the vehicle door. Various types of passive type seat belt arrangements are known, and one as shown in FIG. 7 and FIG. 8 is a typical example, wherein a belt 100 has its one end secured to a lower portion of a door panel 101, and has its opposite end wound around a retractor 104 which is contained in a door panel 101 through a through ring 103 provided on a door sash panel portion 102.

Provided intermediately at the belt 100 is a through tongue 107 which serves to secure the central portion of the belt 100 to a buckle 106 provided centrally at the seat 105.

This passive type seat belt is designed such that the belt is partially wound around the body of the driver by means of the retractor 104 upon the driver sitting down in the seat 105 and closing the door panel 101. Two retractors are often provided, one on a shoulder portion and an other on a lap side of the occupant, these retractors having a lock mechanism incorporated therein so as to be actuable in the event of an emergency. These shoulder retractor and lap retractor arrangements are separately mountable on the belt via a bracket.

In the above-described prior art, however, the need of separately mounting the shoulder and lap retractors on a vehicle body entails a rather cumbersome mounting procedure. Moreover, a poor workability results from the need of holding the bracket in position while the bracket is being attached in place.

OBJECTS AND SUMMARY OF THE INVENTION

It is therefore an object of the present invention to provide a device for mounting a passive type seat belt which may overcome the above-described problems and thereby improving its mounting procedure.

It is an another object of the present invention to provide a device for mounting a passive type seat belt which may facilitate the mounting of the retractor.

To accomplish the above objects, the present invention provides a mounting structure for a passive type seat belt wherein a seat belt retractor is incorporated in the rear surface of the door panel, and wherein said retractor is loaded beforehand in the bracket which is then arranged in the door panel.

To further ensure the accomplishment of the above objects, the present invention provides a mounting structure for a passive type seat belt wherein a seat belt retractor is incorporated in the rear surface of the door panel, and wherein shoulder and lap retractors are secured in place to a common bracket, whereas the inner panel of the door panel is formed with bracket mounting holes which correspond with said bracket and a step is formed at least in the lower edge portion of the mounting holes for holding the bracket in position.

BRIEF DESCRIPTION OF THE DRAWINGS

FIG. 1 and FIG. 2 illustrate one embodiment of the seat type belt mounting structure in accordance with the present invention, wherein;

FIG. 1 is a perspective view of a vehicle with a door rim removed;

FIG. 2 is a an exploded cross-sectional view with the seat belt removed;

DETAILED DESCRIPTION OF PREFERRED EMBODIMENTS

One embodiment of the present invention will be described in detail hereinbelow by way of example, making reference to accompanying drawings.

Figure 1:
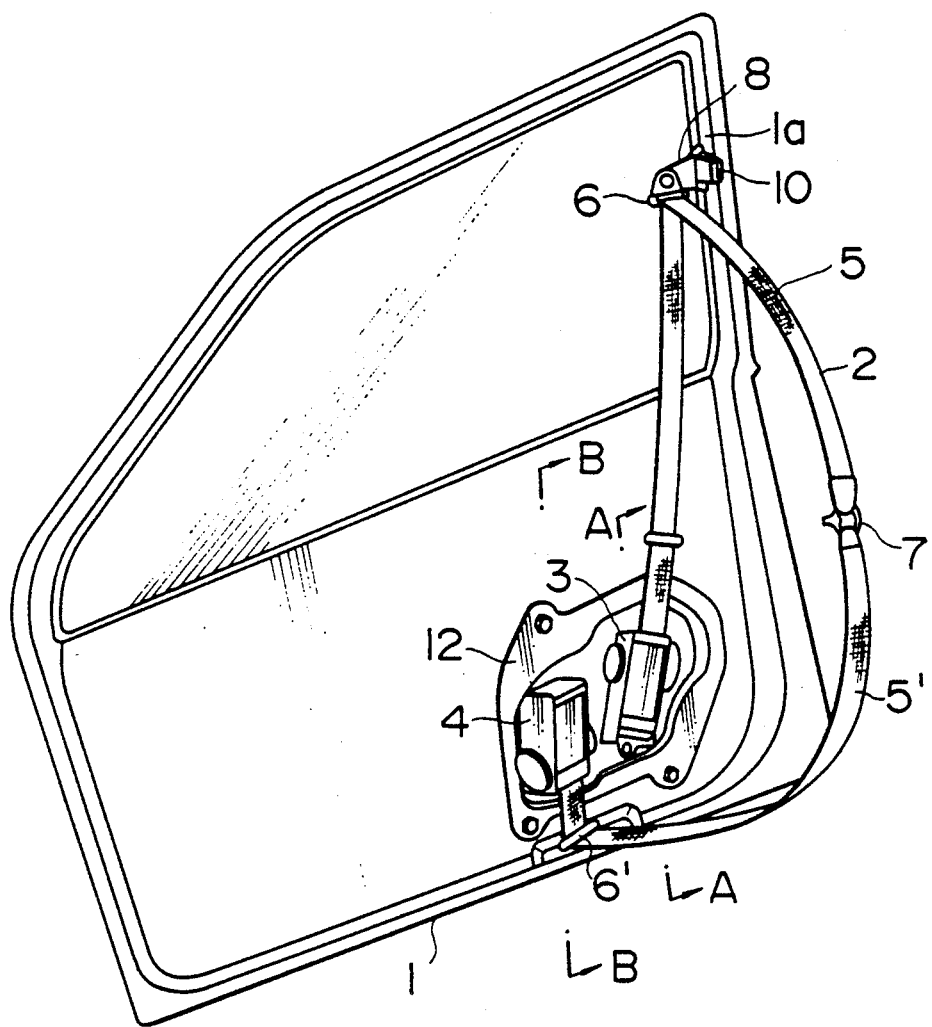
Figure 2:
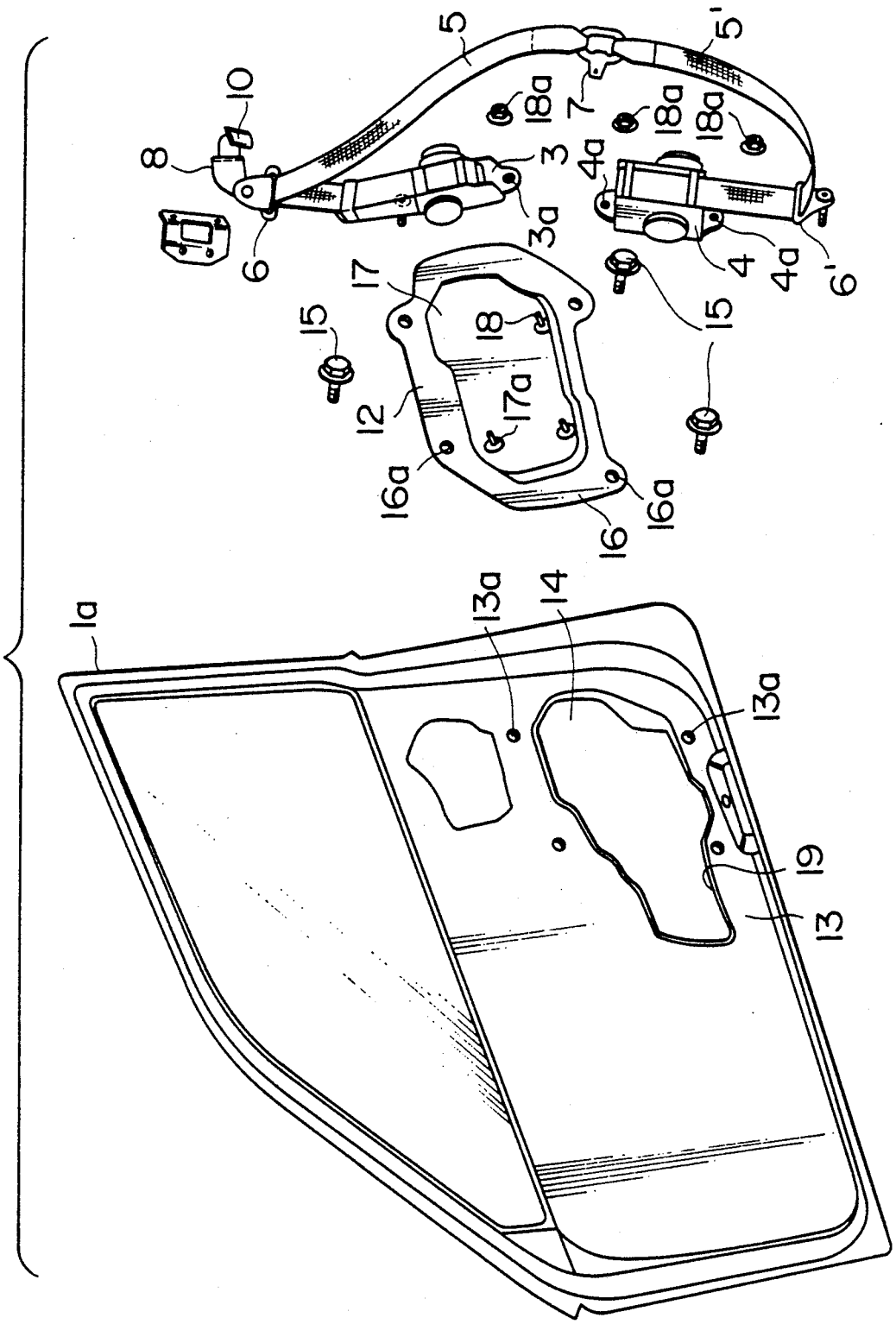
Figure 3:
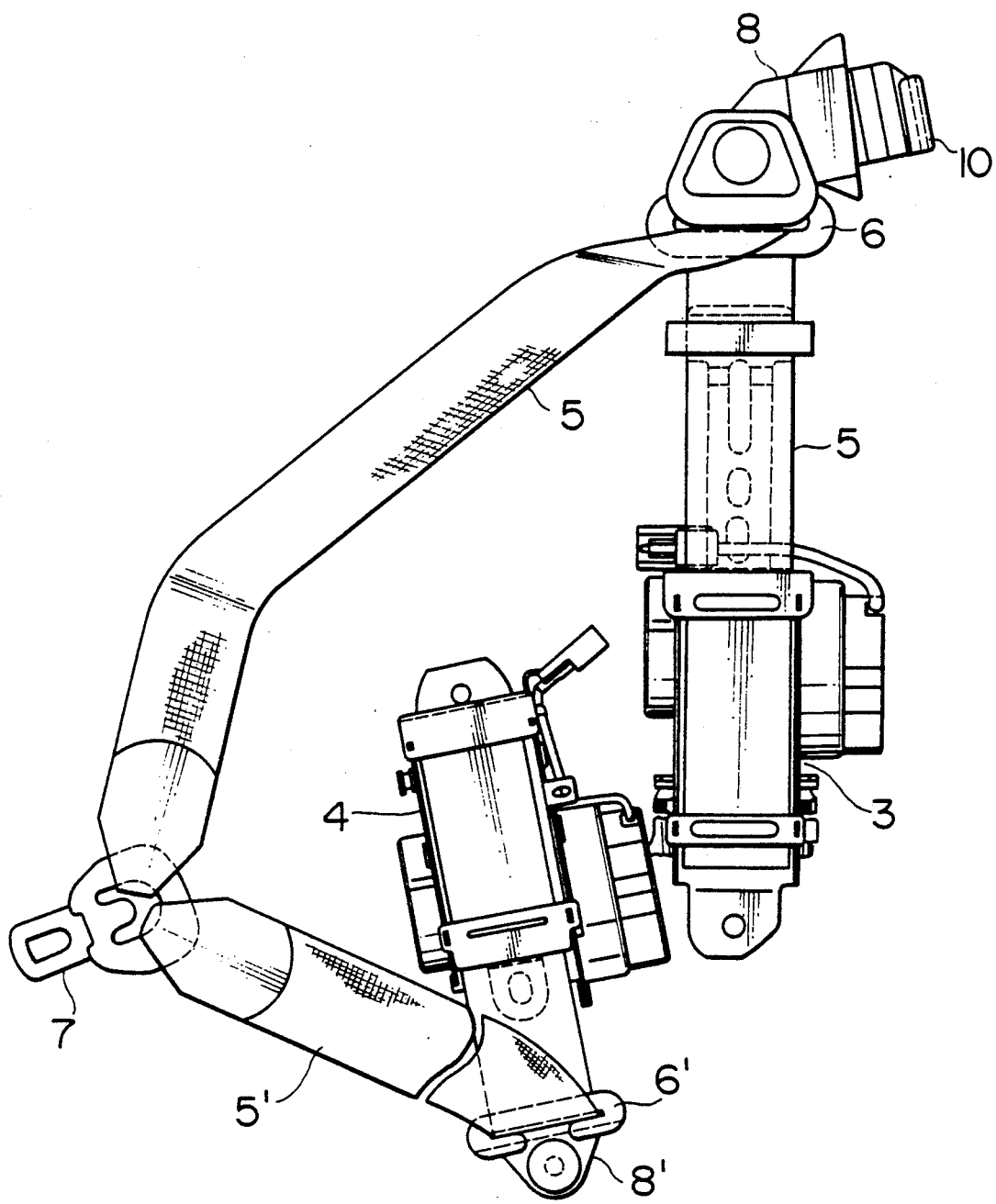
FIG. 3 is a view conceptionally illustrating a seat belt structure.
Figure 4:
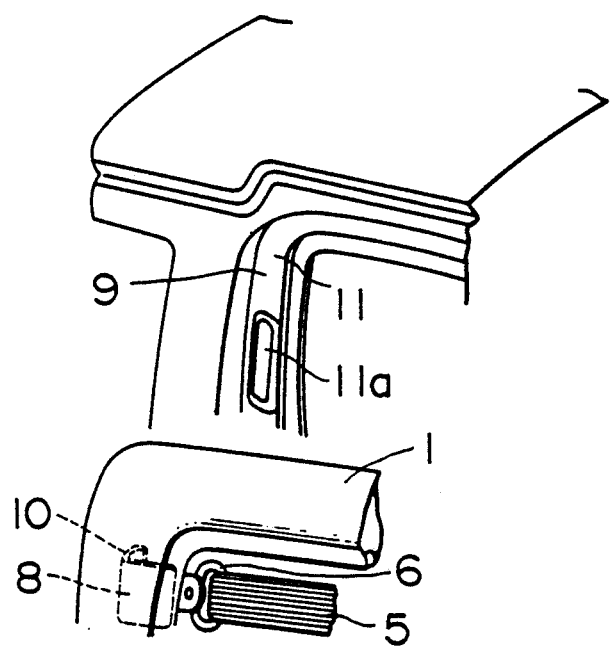
FIG. 4 is a perspective view illustrating a striker and its receiving hole.

In FIG. 1 through FIG. 3, there are illustrated a door panel 1, and a passive type seat belt 2. The seat belt body 2 consists of belts 5, 5' having its opposite ends wound around a shoulder retractor 3 and a lap retractor 4, through rings 6, 6' for supporting the intermediate portions of the belts 5, 5' around the sash portion 1a of the door panel and the lower portion of the door panel 1, and a through tongue 7 provided at the tip end of the seat belts 5, 5' and secured on a buckle (not shown) centrally on the seat. The through ring 6 is attached to a belt anchor 8 which is in turn secured to a sash portion 1a so that the through ring 6 may support a belt 5 withdrawn from the shoulder retractor 3. The through ring 6' is attached to a belt anchor 8' which is in turn secured to the door panel 1 so that the ring 6' may support a belt 5' withdrawn from a retractor 4. The belt anchor 8 is provided with a striker 10 which projects outwardly to the body side 9. The pillar 11 of the body 9 which opposes against the striker 10 is formed with a hole 11a in which the striker 10 is received when the door panel 1 is closed, as shown in FIG. 4.

The shoulder retractor 3 and the lap retractor 4 are attached to a common bracket 12, and then placed in a bracket mounting hole 14 formed in the inner panel 13 of the door panel 1 through a bolt 15. The bracket 12 is formed in a dish-like configuration utilizing a draw forming, having a flange 16 formed therearound for fixed placement. Bolt holes 16a and 17a are defined in a predetermined number between the flange 16 of the bracket 12 and a bottom surface portion 17. The bolt 18 is inserted through the bolt hole 17a, whereas the shoulder retractor 3 and the lap retractor 4 are secured in position by threading the bolt 18 through their mounting holes 3a and 4a respectively.

Figure 5:
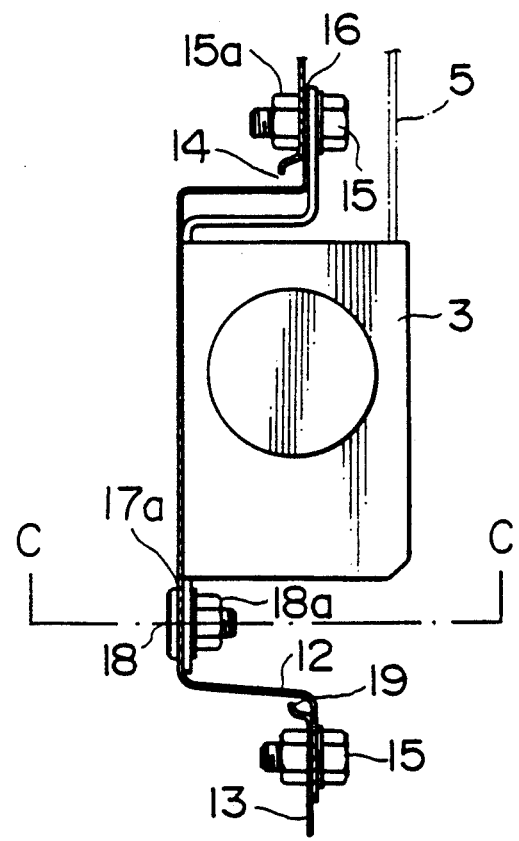
FIG. 5 is a cross-sectional view taken along a line A—A in FIG. 1.
Figure 5A:
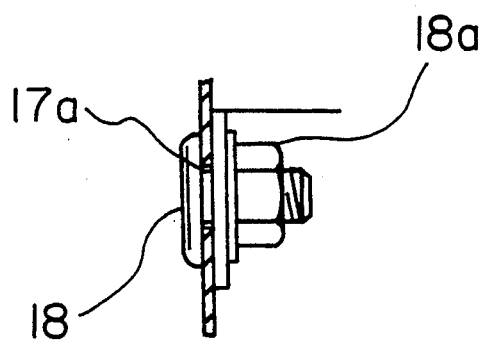
FIG. 5a is a cross-sectional view taken along line C—C in FIG. 5.
Figure 6:
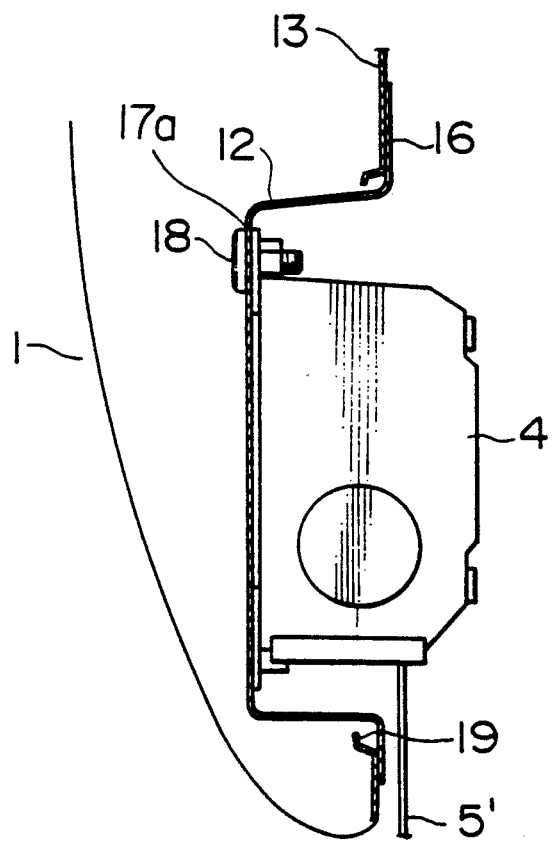
FIG. 6 is a cross-sectional view taken along a line B—B in FIG. 1.
Figure 7:
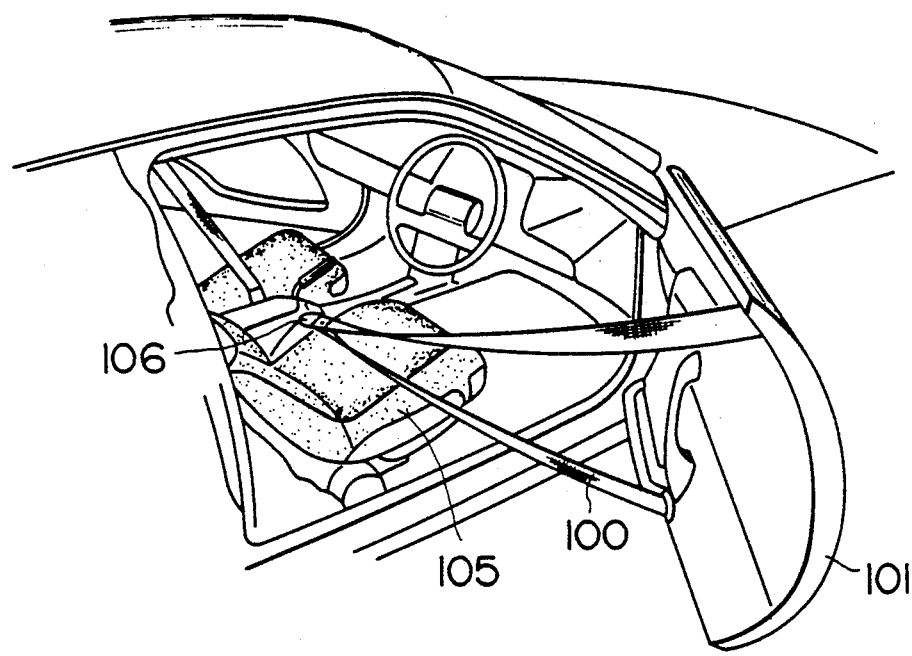
FIG. 7 is a perspective view illustrating a traditional mounting structure for a passive type seat belt.
Figure 8:
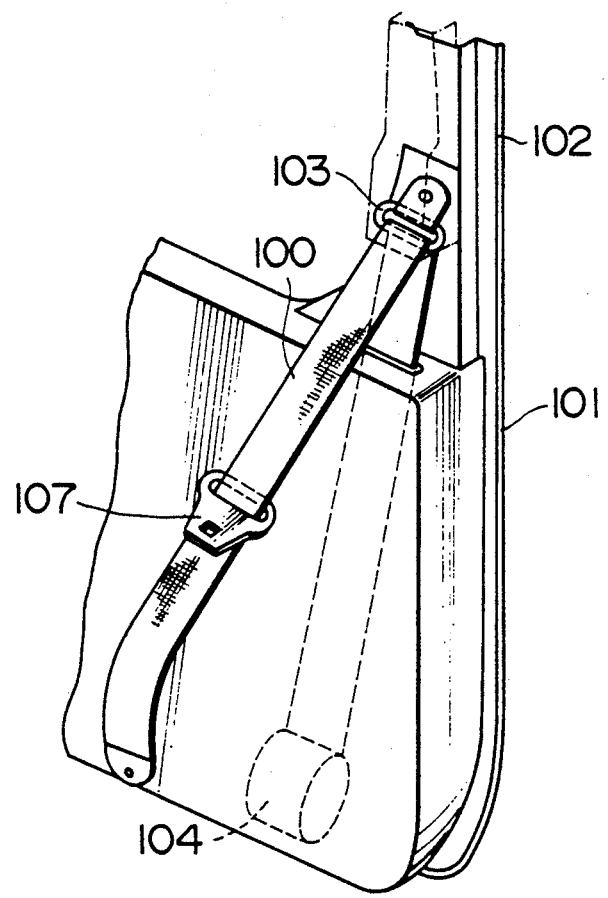

On the other hand, the bolt hole 16a is aligned with the mounting hole 13a in the inner panel 13, and then the bracket 12 is fixed in position on the inner panel 13 via the bolt 15 and the nut 15a. The bracket mounting hole 14 is formed with a configuration which corresponds with the profile of the bracket 12, as shown in FIG. 5, and the bracket mounting hole 14 is formed with a step 19 around its peripheral edge, for placement of the bracket. The step 19 serves not only to strengthen the inner panel 13, but also to locate the bracket 12 in place when the bracket 12 is inserted into the bracket mounting hole 14. A door rim is arranged around the external side of the bracket 12 to close the surface of the door.

In the above-described arrangement, the shoulder retractor 3 and the lap retractor 4 are mounted on the bracket 12 which is then placed upon the step 19 at the lower portion of the bracket mounting hole 14 to align it with the mounting hole 14. Then, the rear surface of the bracket 12 is inserted into the mounting hole 14 for engagement with the flange 16. Subsequently, the bolt 15 is inserted into the bolt hole 16a in the flange 16 and then the bolt is tightened.

As above-described, in the passive type seat belt mounting structure in accordance with the present invention, the shoulder retractor and the lap retractor are attached to the bracket and then they are mounted in the mounting hole in the inner panel as a unit, and thus their mounting procedure may be made efficient. Besides, since the hole into which the inner panel is mounted is closed off by means of the bracket, it is thus possible to prevent the inner panel from being reduced in strength. Moreover, as the retractor is provided within the bracket, the retractor can be effectively protected against the ingress of dust and water, while preventing it from deformation during transportation. Furthermore, the bracket can be placed in position by utilizing the step 19 formed at the lower edge of the bracket mounting hole, when the bracket is being attached in the bracket mounting hole in the inner panel, and consequently the bracket may be attached in place in an efficient way.

What is claimed is:

1. A seat belt mounting structure for a vehicle with a door and a seat positioned adjacent the door, the door having an interior door panel, comprising: a fixing hole formed in the interior door panel; a shoulder belt retractor including a shoulder belt and a lap belt retractor including a lap belt; a bracket, said shoulder belt retractor and said lap belt retractor each being mounted to said bracket, said bracket carrying said shoulder belt retractor and said lap belt retractor being positioned in said fixing hole, fixed to said door panel with said shoulder belt retractor and lap belt retractor being positioned substantially in parallel with said shoulder belt retractor being positioned rearwardly of said lap belt retractor with respect to a forward and rearward end of the vehicle; a belt anchor connected to an upper part of the door panel, said shoulder belt retractor being slanted slightly from a parallel position with respect to said lap belt retractor such that a pulling direction of said shoulder belt, from said shoulder belt retractor, is substantially in a direction of said belt anchor, said shoulder belt being positioned engaging said belt anchor; a through ring connected to a lower part of the door panel, said lap belt retractor being positioned such that said lap belt is pulled in a direction of said through ring and engages said through ring, said shoulder belt and said lap belt being connected, at a position beyond the engagement between said shoulder belt and said belt anchor and said lap belt and said ring, by a through tongue element, said through tongue element being engagable with a buckle provided on a side of the seat opposite said door.

2. A seat belt mounting structure according to claim 1, wherein said fixing hole includes a recessed stair portion formed around the periphery of said fixing hole, said recessed stair portion extending toward an inside of said door panel, said bracket being affixed to said door panel with said base of said stair portion providing a guide for positioning said bracket relative to said door panel.

3. A seat belt mounting structure according to claim 2, wherein, said fixing hole is formed of a predefined shape, said bracket including a recessed portion forming a space for receiving each of said shoulder retractor and said lap retractor, said recessed portion having a shape substantially corresponding to said shape of said fixing hole.

4. A seat belt mounting structure, comprising: a vehicle door including an interior door panel forming a fixing hole, said fixing hole having a predetermined periphery shape; a shoulder belt retractor including a shoulder belt; a lap belt retractor including a lap belt; a bracket including a bracket flange plate surrounding a bracket recessed portion, said recessed portion defining a first space for receiving said shoulder belt retractor and defining a second space for receiving said lap belt retractor, said shoulder belt retractor and said lap belt retractor being mounted on said fixing plate, substantially in parallel, said fixing bracket being mounted to said door panel, said recess of said fixing bracket being shaped to substantially correspond to the shape of the periphery of said fixing hole, said fixing hole having a periphery including a recessed step portion for guiding by receiving said mounting bracket; a shoulder belt anchor connected to an upper part of said door panel, said shoulder belt retractor being positioned on said bracket, slightly slanted in the direction of said shoulder belt anchor such that a direction of pull of said shoulder belt extends upwardly and rearwardly toward said shoulder belt anchor, said shoulder belt being passed through said shoulder belt anchor; and, a through ring connected to a lower part of said door panel, said lap belt retractor being positioned forwardly of said shoulder belt retractor and such that a direction of pull of said lap belt extends downwardly toward said through ring; and a through tongue connected to each of said lap belt and said shoulder belt, said through tongue being connectable to a buckle positioned at a side of a seat adjacent said door which is opposite from said door thereby allowing said buckle to be maintained connected to said through tongue as the door is opened and shut while allowing access to said seat.

* * * * *